T. W. RUSSELL.
SPOON ATTACHMENT FOR DENTAL SYRINGES.
APPLICATION FILED AUG. 11, 1913.

1,121,669.  Patented Dec. 22, 1914.

Witnesses
E. C. Skinkle
Geo. Knutson

Inventor
Thomas W. Russell
By his Attorneys

UNITED STATES PATENT OFFICE.

THOMAS W. RUSSELL, OF MINNEAPOLIS, MINNESOTA.

SPOON ATTACHMENT FOR DENTAL SYRINGES.

1,121,669. Specification of Letters Patent. Patented Dec. 22, 1914.

Application filed August 11, 1913. Serial No. 784,190.

*To all whom it may concern:*

Be it known that I, THOMAS W. RUSSELL, a citizen of the United States, residing at Minneapolis, in the county of Hennepin and State of Minnesota, have invented certain new and useful Improvements in Spoon Attachments for Dental Syringes; and I do hereby declare the following to be a full, clear, and exact description of the invention, such as will enable others skilled in the art to which it appertains to make and use the same.

My invention relates particularly to dental syringes, and has for its object to provide a sort of a spoon attachment therefor, adapting it for use to depress the tongue or cheeks while working on the teeth and while using the syringe to direct a spray of water into the cavity or onto a tooth that is being treated.

This attachment is also adapted for application to the dental air pipes which are very generally used in dentistry for directing a blast of air to the tooth being treated. Hence, for convenience, and as a generic term, I use the expression "dental spray pipe" to include both the water delivery pipe of a dental syringe, for example, or the air delivery pipe of a dental blower.

In the accompanying drawings wherein like characters indicate like parts throughout the several views, my invention is shown as applied to a dental syringe.

Figure 1:
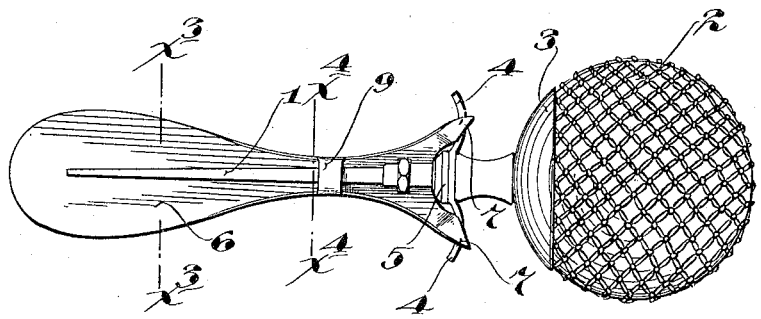
Figure 2:
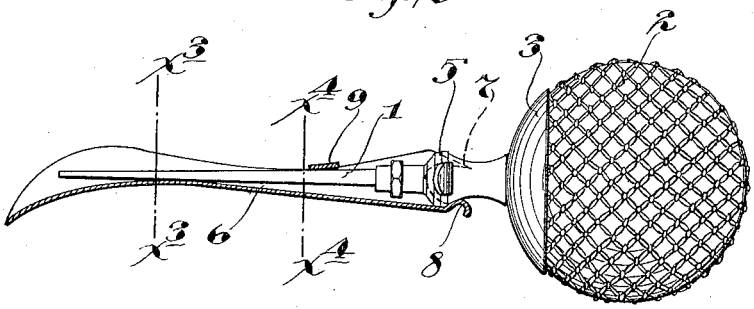
Figure 3:
Figure 4:
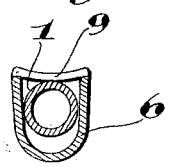

Referring to the drawings: Figure 1 is a plan view showing a dental syringe having my improved tongue and cheek depresser applied thereto; Fig. 2 shows the syringe in side elevation and the attachment in vertical section; Fig. 3 is a transverse section taken on the lines $x^3$ $x^3$ on Figs. 1 and 2; and Fig. 4 is a transverse section taken on the lines $x^4$ $x^4$ on Figs. 1 and 2.

The dental syringe shown is of standard construction and of the parts thereof, the numeral 1 indicates the spray pipe, the numeral 2 the rubber bulb. In the type of dental syringe shown, the pipe 1 has a concavo-convex head 3, oppositely projecting finger pieces 4, and an enlarged collar-like portion 5 adjacent to the said finger pieces. The bulb 2 is secured in the head 3 and has communication with the base end of the pipe 1. The so-called enlarged collar 5 is usually formed in part by a clamping nut screwed onto the pipe 1 and clamping the finger pieces 4 against the shoulder thereof.

The tongue and cheek depressing attachment is a sort of a spoonlike structure, preferably stamped from thin sheet metal and properly plated and having a channel-shaped stem portion (see Fig. 4) and an approximately V-shaped outer end portion (see Fig. 3), which outer end portion is curved longitudinally, as best shown in Fig. 2. At that end which is slipped onto the pipe 1, this attachment or so-called spoon 6 is formed with outwardly flaring fingers 7 and with a curved retaining lip 8. At its intermediate portion, the said spoon or attachment is formed with a small cross bar 9. When the spoon or attachment is secured on the pipe 1, the outer end of the pipe will bear against the curved outer portion of the channel of the said spoon, the intermediate portion of the pipe will bear against the cross bar 9, and prongs 7 will rest on the finger pieces 4 of the said pipe, and the lip 8 will be sprung over the enlarged portion or flange 5 of the said pipe. In this way, the spoon will be quite securely held to the pipe and will also be held against rotation thereon. The lip 8 can be quite easily sprung, as can also the cross bar 9 and the pipe 1, itself, so that the said parts can be quite readily engaged, as just stated, and can also, when desired, be readily separated, but when engaged will prevent accidental displacement of the spoon or attachment. It is important to note (see Fig. 2), that when the spoon or attachment is applied to the pipe 1, it will project beyond the delivery end of the latter and will curve away from the same, so that it will not interfere with the proper delivery of water or air from the said pipe, and furthermore, will serve to hold the tongue or cheek depressed and away from the tooth being treated.

In the use of drills, polishing wheels, and other dental tools, it is in many instances almost impossible to keep such tools out of contact with the tongue or cheek. In the use of tools for grinding or drilling the teeth, either a spray of water or air is required to prevent heating and to wash or blow away the cuttings, two hands are required for this work, so that an independently operated spoon or depresser cannot be handled. With the spoon or depresser attached to the syringe, or spray pipe, all this is made an easy matter.

Air pipes and some types of dental syringes do not have either the finger pieces 4 nor the enlargement 5. In the application of the spoon or attachment of such dental tools, it may be slipped on and frequently held, or in some instances, it may be permanently secured thereon. In a dental syringe, of the character shown, but with the said elements 4 and 5 omitted, the spoon may be slipped back on the tube until the prongs 7 strike the head 3, thereby causing the spray pipe to be frictionally pinched by the cross bar 9, lip 8, and by the outer curved portion of the spoon.

What I claim is:

1. The combination with a dental syringe pipe having laterally projecting finger pieces and an enlargement adjacent thereto, of a tongue and cheek depressing attachment of channel shape form, having an intermediate cross bar and having at its inner end projecting prongs, and a securing lip, which prongs are engageable with the finger pieces of said pipe and which lip is engageable over the enlargement thereof.

2. A cheek and tongue depressing attachment for dental syringe pipes having a channel-shaped form in cross section, provided with an intermediate cross bar, having a curved outer end and provided at its inner end with laterally projecting prongs and with a coöperating inwardly bent retaining lip.

In testimony whereof I affix my signature in presence of two witnesses.

THOMAS W. RUSSELL.

Witnesses:
BERNICE G. WHEELER,
HARRY D. KILGORE.

Copies of this patent may be obtained for five cents each, by addressing the "Commissioner of Patents, Washington, D. C."